(12) United States Patent
Min et al.

(10) Patent No.: US 8,140,522 B2
(45) Date of Patent: Mar. 20, 2012

(54) METHOD, APPARATUS, AND COMPUTER PROGRAM PRODUCT FOR ADAPTIVE QUERY PARALLELISM PARTITIONING WITH LOOK-AHEAD PROBING AND FEEDBACK

(75) Inventors: Hong Min, Poughkeepsie, NY (US); Yefim Shuf, Ossining, NY (US); Terence Patrick Purcell, Springfield, IL (US); You-Chin Fuh, San Jose, CA (US); Chunfeng Pei, San Jose, CA (US); Ou Jin, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 12/190,057

(22) Filed: Aug. 12, 2008

(65) Prior Publication Data

US 2010/0042607 A1   Feb. 18, 2010

(51) Int. Cl.
*G06F 7/00* (2006.01)
*G06F 17/30* (2006.01)
(52) U.S. Cl. ......... 707/718; 707/731; 707/759; 707/764
(58) Field of Classification Search .................... 707/718
See application file for complete search history.

(56) References Cited

U.S. PATENT DOCUMENTS

| | | | | |
|---|---|---|---|---|
| 5,574,900 | A * | 11/1996 | Huang et al. | 1/1 |
| 6,009,265 | A * | 12/1999 | Huang et al. | 1/1 |
| 6,092,062 | A * | 7/2000 | Lohman et al. | 1/1 |
| 6,289,334 | B1 * | 9/2001 | Reiner et al. | 1/1 |
| 6,819,924 | B1 * | 11/2004 | Ma et al. | 455/425 |
| 2002/0194173 | A1 * | 12/2002 | Bjornson et al. | 707/4 |
| 2004/0122845 | A1 | 6/2004 | Lohman et al. | |
| 2004/0249799 | A1 * | 12/2004 | Demarcken et al. | 707/3 |
| 2005/0131893 | A1 | 6/2005 | Von Glan | |
| 2005/0177553 | A1 * | 8/2005 | Berger et al. | 707/3 |
| 2005/0289098 | A1 | 12/2005 | Barsness et al. | |
| 2006/0218123 | A1 | 9/2006 | Chowdhuri et al. | |
| 2007/0250470 | A1 * | 10/2007 | Duffy et al. | 707/2 |

(Continued)

FOREIGN PATENT DOCUMENTS

GB 2297180 7/1996

(Continued)

OTHER PUBLICATIONS

Barlos et al., A load balanced multicomputer relational database system for highly skewed data, Parallel Computing, Elsevier Publishers, Amsterdam, NL, vol. 21, No. 9, Sep. 1, 1995, pp. 1451-1483, XP004062644.

(Continued)

*Primary Examiner* — Don Wong
*Assistant Examiner* — Binh V Ho
(74) *Attorney, Agent, or Firm* — Ryan, Mason & Lewis, LLP

(57) ABSTRACT

A database query is partitioned into an initial partition including a plurality of parallel groups, and is executed, via an execution plan, based on the initial partition. A sampling subset of data is identified from the plurality of parallel groups. Substantially in parallel with the executing of the query, the execution plan is executed on the sampling subset of data as a sampling thread. The execution plan is modified based on feedback from the execution of the execution plan on the sampling subset of data.

24 Claims, 4 Drawing Sheets

U.S. PATENT DOCUMENTS

| | | | |
|---|---|---|---|
| 2008/0065591 A1* | 3/2008 | Guzenda | 707/2 |
| 2008/0104041 A1* | 5/2008 | Bjornson et al. | 707/3 |
| 2008/0147599 A1* | 6/2008 | Young-Lai | 707/2 |
| 2008/0162409 A1* | 7/2008 | Meijer et al. | 707/2 |
| 2009/0024568 A1* | 1/2009 | Al-Omari et al. | 707/2 |
| 2009/0144346 A1* | 6/2009 | Duffy et al. | 707/205 |
| 2009/0198907 A1* | 8/2009 | Speight et al. | 711/137 |

FOREIGN PATENT DOCUMENTS

| | | |
|---|---|---|
| JP | 2007199804 | 9/2007 |
| WO | WO 98/26360 | 6/1998 |
| WO | WO 02/071260 | 9/2002 |

OTHER PUBLICATIONS

Barlos et al., DOME: Dynamic optimization on multiprocessor engines, a statistical approach, Thesis, Jan. 1, 1993, pp. 1-181 XP009124234.

Barlos et al., A join ordering approach for multicomputer relational databases with highly skewed data, System Sciences, 1994, vol. II: Software Technology, Proceedings of the Twenty-Seventh Hawaii International Conference on Wailea, HI, Jan. 4-7, 1994, pp. 253-262, XP010097004.

Ng K W et al., Dynamic query re-optimization, Scientific and Statistical Database Management, 1999. Eleventh International Conference on Cleveland, OH, USA Jul. 28-30, 1999, pp. 264-273, XP010348725.

Haas P. J et al., Sequential sampling procedures for query size estimation, Proceedings of the ACM Sigmod International Conference on Management of Data, San Diego, Jun. 2-5, 1992, pp. 341-350 XP002267327.

Lipton R J et al., Practical selectivity estimation through adaptive sampling, Sigmod Record USA, vol. 19, No. 2, Jun. 1990, pp. 1-11 XP002553145.

* cited by examiner

METHOD, APPARATUS, AND COMPUTER PROGRAM PRODUCT FOR ADAPTIVE QUERY PARALLELISM PARTITIONING WITH LOOK-AHEAD PROBING AND FEEDBACK

FIELD OF THE INVENTION

The present invention relates to the electrical, electronic and computer arts, and, more particularly, to relational database management systems (RDBMS) and the like.

BACKGROUND OF THE INVENTION

A relational database management system (RDBMS) often uses query parallelism to reduce query processing time. One common approach for query parallelism is to allow several threads to carry out similar execution paths in parallel on different (possibly overlapping) subsets of data (work items) for the query. The number of work items can be the same as, or more than, the number of execution threads. In the former case, each thread is assigned one work item. In the latter case, usually there are many fine grain partitioned work items, and each thread takes one or more remaining work items for processing in a rotating fashion. In some cases, data associated with one or more work items needs to be aggregated during query execution, such as after sort or materialization, and re-partitioned before being processed further. Fine grain partitioning is one known solution to handle skewed data. However, this approach resolves the problem by producing a larger number of tasks than can be processed at any one time. Furthermore, this approach introduces overhead in context switching between these multiple tasks, and it does not guarantee that the partitioning strategy is optimal for downstream tables.

This intra-query partitioning decision is usually made at query optimization time by analyzing statistics of data or some subset of data. The actual and accurate distributions and correlations of data among tables are usually not known until a query is processed. In addition, some tables joined in the later stages of a long sequence of a join-pipeline can introduce a significant size skew of different work items, which is not anticipated at the query optimization time. These issues may cause the partition decision made at the optimization time to be less optimal at the execution time.

SUMMARY OF THE INVENTION

Principles of the present invention provide techniques for adaptive query parallelism partitioning with look-ahead probing and feedback. In one aspect, an exemplary method (which can be computer implemented) includes the steps of partitioning a database query into an initial partition including a plurality of parallel groups, and executing the query, via an execution plan, based on the initial partition. An additional step includes identifying a sampling subset of data from the plurality of parallel groups. Another step includes, substantially in parallel with the executing of the query, executing the execution plan on the sampling subset of data as a sampling thread. Yet another step includes modifying the execution plan based on feedback from the execution of the execution plan on the sampling subset of data.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

One or more embodiments of the invention may offer one or more of the following technical benefits: (i) reducing or minimizing chances of a "performance disaster" situation, such as, for example, the case where an expensive query is executed in parallel initially, but then most of its smaller tasks complete while the bulk of the work is still being processed by only one or a handful of tasks; (ii) better utilization of a multi-core system; (iii) improving query execution performance and reducing query response time; and/or (iv) a balanced utilization of system resources.

These and other features, aspects and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
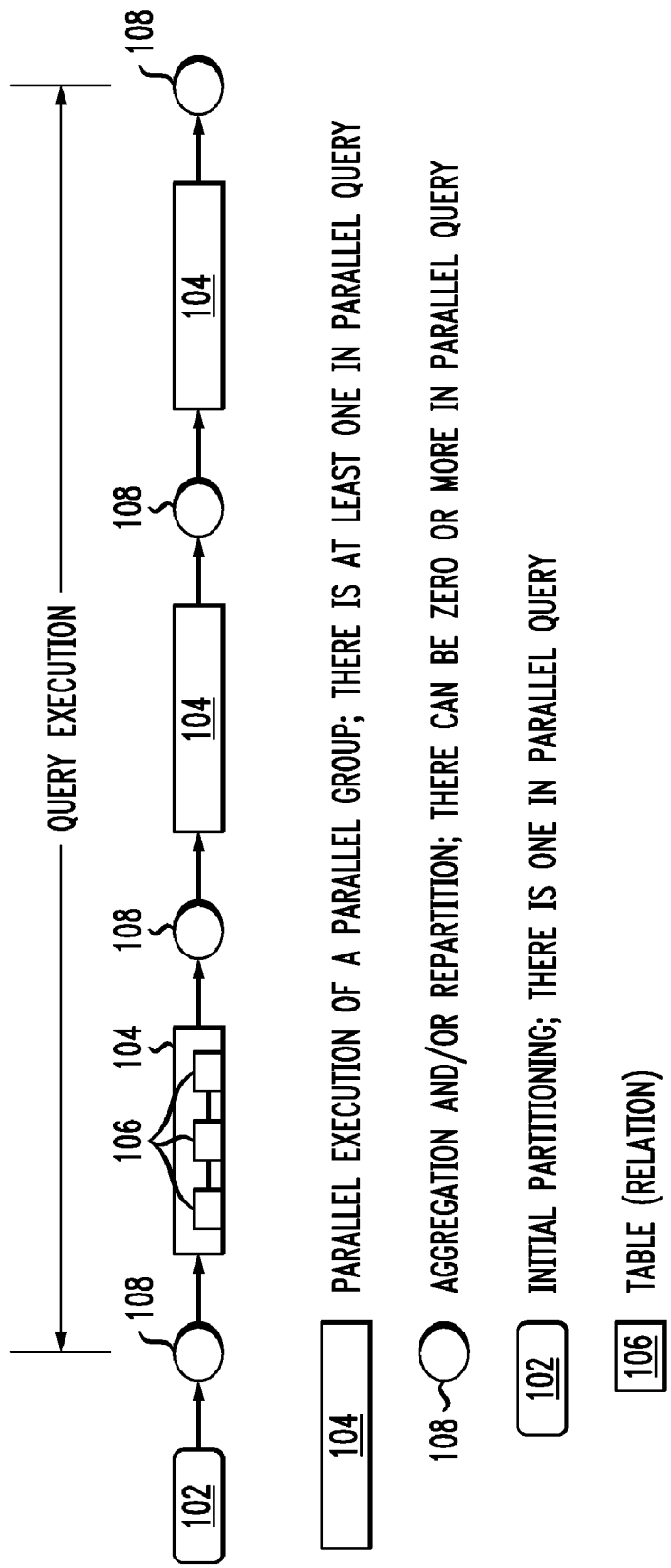
FIG. 1 shows a prior art approach.

One or more embodiments of the invention adaptively adjust the sub-optimal intra-query parallel partition decision made before and/or during query execution with real-time sampled information on data and system workload. In one or more instances, at the beginning of query processing, in addition to having a query processing thread, the system uses one or more threads to execute the same execution plan (or a portion thereof) on a small set of selected data, to sample execution characteristics of a query, such as its data distribution, join fan-out, central processing unit (CPU) and input/output (I/O) costs, a location of objects being accessed (a disk versus a buffer pool) during query execution, and the like. This sampling method is also referred to herein as "look-ahead probing." The sampled information can be used in several ways. One way is to inject it into a predefined aggregation point of query execution, when a partition or re-partition is performed, to influence that partitioning decision. Another way is to make a decision such as whether the entire set of work items has to be re-partitioned and the execution has to be restarted.

One or more embodiments of the invention can be implemented independently of, or complementary to, fine grain partitioning query parallelism, allowing a more targeted number of parallel tasks to be spawned based upon execution time information, rather than estimation from compilation and/or bind time statistics that may be unreliable. Existing parallelism implementations are unable to readjust the number of parallel tasks based upon execution time knowledge of downstream tables participating in the joins. In addition, sampling results can be saved with a time stamp for future query processing to be used in query optimization to improve bind time decisions. The runtime decision change influenced by sampling can also be saved for analyzing effectiveness of sampling off-line. Optionally the runtime sampling and feedback approach set forth herein can be started only if the system has "low confidence" in the bind time optimization decision, if such a factor exists. Many reasons can cause "low confidence" in the bind time decision, such as an insufficient statistics collection algorithm (e.g., not all statistics are gathered), statistics not being up-to-date, obsolete sampling results, and so on. Other factors that may influence the decision with regard to sampling are the available system resources and on-going workload.

Intra-query parallelism is used to break a query into subtasks, and process them in parallel, using different central processing unit (CPU) or input/output (I/O) threads to reduce query response time. The partitioning for a multi-table join (multi-join) query is usually performed on one or a few tables that are involved in pipelined processing. One example is to partition on the first table's distinct keys, or on physical locations on the disk. The decision of how, when, and/or where to partition in the series of query operations is made at query compilation and/or optimization time, which is before query execution. The decision may be based, for example, on previously gathered query object statistics, estimated filtering from query predicates and available system resources. In the prior art, decisions, such as which tables are used for partitioning and how many partitions are generated, remain unchanged during the course of query execution. In one or more embodiments of the invention, decisions, such as which tables are used for partitioning and how many partitions are generated, can change during the course of query execution.

Frequently, the partitioning decisions for multi-join queries are less optimal. This is an impediment for getting good query performance. There are problems such as (i) unbalanced workloads for each subtask, caused by insufficient or infrequently refreshed database statistics (refreshing database statistics is expensive), and (ii) a smaller number of partitioned working sets than the number of available tasks to fully utilize allocated system resources, caused by insufficient database statistics, infrequently refreshed database statistics and imprecise filter factor estimation at compilation time FIG. 1 illustrates a typical flow of intra-query parallel execution, according to a process not employing techniques of the invention. The parallelism partitioning decision is made before query execution. Initial partitioning is shown at 102. There are one or more parallel groups 104 in the execution, each with a number of work items partitioned on the tables 106. Each parallel group can process one table 106, or the join of multiple tables. There are zero or more aggregation points 108 in the exemplary execution, at least one between two parallel groups 104. A new parallel group 104 is created at the aggregation points 108. The aggregation can be an operator such as sort, materialization, group by, average, sum, and so on.

Figure 2:
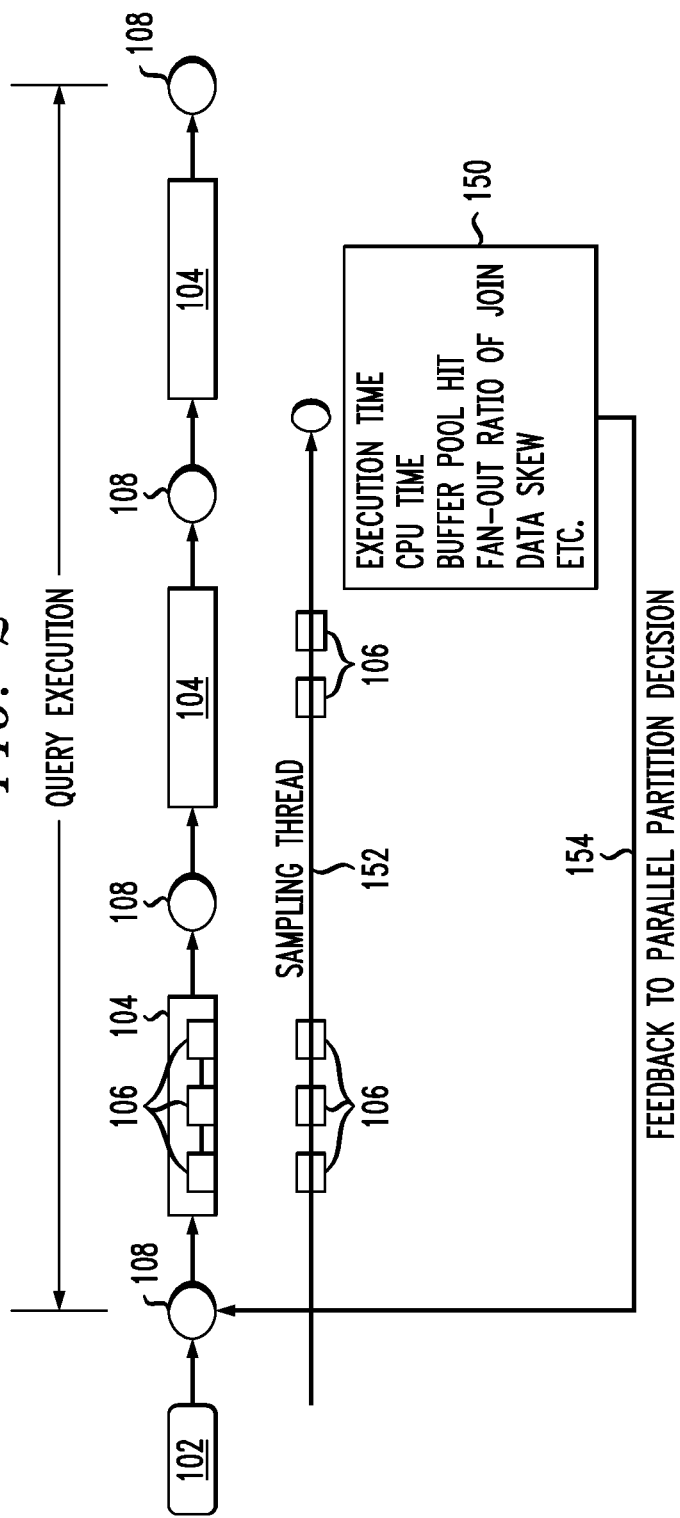
FIG. 2 shows an exemplary embodiment of certain techniques, according to an aspect of the invention.

FIG. 2 depicts an exemplary embodiment of the invention which introduces a new sampling thread 152 that processes a small sample of the relations in the same execution plan. Sampling is started on a small subset of data, such as one or a few rows of the first sampling table 106 or one or a few rows of each partitioned "work set" of the first sampling table 106. Sampling may start, for example, at the beginning of the execution plan; that is, from the first table 106 in the entire processing sequence. Sampling may also start in the middle of the processing sequence such as, for example, the second, third, or in general $N^{th}$ table in the join sequence. A decision on where sampling starts is made before the query execution.

A sample row or rows may be selected as the first row or rows of a table 106 or a partition, or selected randomly from the table 106 or a partition if a random sampling is needed. Sampling can proceed through all phases of the execution paths. Sampling may also finish once a subset of several phases of the execution paths are examined, if it is considered that significant relations and execution paths have being sampled. A decision on whether or not to sample all phases is made before the query execution (for example, at a bind time). As shown at block 150, sampling collects, for example, one or more of the following pieces of data:

The fan-out ratio of a multi-join ("one row in one table corresponds to N rows in one other subsequent table")

Data distribution skew

The CPU time (for example, aggregate time and/or breakdown) to execute the sampling thread to gather and process these samples The elapsed time to process these samples Whether or not the objects being sampled are found in the buffer pool during sampling.

Thus, in the exemplary embodiment of FIG. 2, during query execution, the system dynamically adjusts the previously made sub-optimal intra-query parallel partitioning decision by using real-time sampled information on data and system workload.

In one or more embodiments, a feedback mechanism 154 takes a data sample and influences the partitioning decision of the execution. One approach to influence the partitioning decision is to use a process similar to the bind time parallelism optimization process present in some database management systems (DBMS). The point in the execution pipeline where the feedback information is injected can be predefined before query execution. Feedback information can be sent to one of the aggregation points 108, as shown in FIG. 2, to influence partitioning decisions on the subsequent parallel groups 104. Feedback information can also be used to determine whether the entire set of work items has to be re-partitioned and the execution has to be restarted.

It should be noted that the sampling size can also be influenced by the current system workload, and that the number of sampling threads is not limited to one. Furthermore, the number of sampling-feedback loops in the sequence of the query execution path is not limited to one, and sampling results can be saved with a time stamp for future query processing. If previous sampling results are saved, then they can be used, for example, as extra statistics during query optimization time In one or more embodiments of the invention, all threads are processing the leading join table or tables, except one sampling thread 152, which is processing more tables further ahead in the join sequence. The sampling thread is typically only looking at a small subset of those tables 106. There may be re-partitioning of work (as a result of the feedback information from a sampling thread), which may be observed, for example, from a database trace; for example, the range of keys to be processed by each of the processing threads would change and would be more balanced across one or more processing threads. There may be a restart of work from the beginning as a result of sampling. There can be more than one sampling thread.

Aspects of the invention thus provide a system, method, and computer program product for executing a query using several parallel tasks 104. An execution plan can include, for example, the working set to be processed by the parallel tasks, the partition 102 of the working set, the operations to be performed on the working sets, the execution plan modification points (such as one or more of the aggregation points 108) among the operations, and the like. A predefined small subset of the working set is selected (above-discussed sampling thread 152 processes the small sample of the relations in the same execution plan). A system is provided for executing the execution plan. A sampling and feedback technique includes a starting execution point in the execution plan, a finishing execution point in the execution plan; one or more execution plan modification points; and the execution information 150 to be collected. Furthermore, the system can execute the first few (or all) operations in the execution plan on the small subset, collect the information related to the execution, and send feedback 154 to one of the execution plan modification points in the execution plan. The system adjusts the working set partitioning of the remaining execution plan using the information collected by the sampling method.

Figure 3:
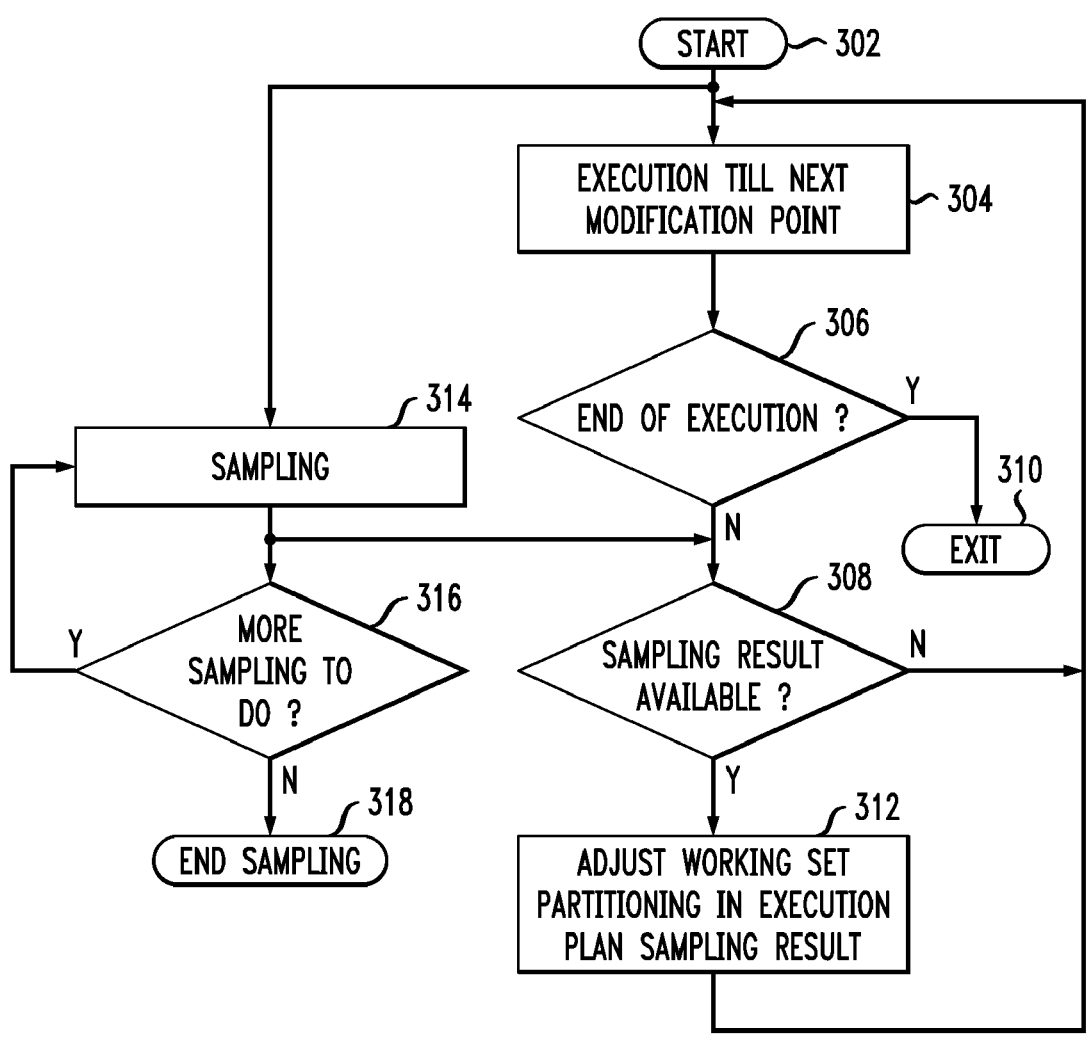
FIG. 3 shows a flow chart of an exemplary method, according to another aspect of the invention.

Attention should now be given to FIG. 3, which depicts a flow chart of exemplary method steps, according to an aspect of the invention. Processing begins in step 302. In step 304, the system begins execution for a query; if the end is reached, as per the "Y" branch of decision block 306, exit as per block 310. While execution is continuing ("N" branch of block 306), the system determines whether a sampling result is available, as per decision block 308. If such a result is not available, as per the "N" branch of decision block 308, continue execution. However, if such a result is available, as per the "Y" branch of block 308, control passes to block 312, where the sampling result is used by the system to influence a partitioning or re-partitioning decision, or even to decide that the whole set of work items has to be re-partitioned and the execution has to be re-started.

In parallel with the steps just described, sampling is carried out on the small set of data, as depicted in step 314. Results of such sampling are provided to the flow on the right side of the chart, just prior to decision block 308. Sampling continues as long as there is more to do, as indicated by the "Y" branch of decision block 316, once there is no more to do, sampling ends, as at block 318 ("N" branch of decision block 316). A sampling execution stops when there is no more sampling to do, i.e., there is no more data to process for the sampling execution.

In view of the discussion thus far, it will be appreciated that, in general terms, an exemplary method (which can be computer-implemented) includes the steps of partitioning a database query into an initial partition 102 including a plurality of parallel groups, and executing the query, via an execution plan, based on the initial partition, as shown at step 304 of FIG. 3. An additional step includes identifying a sampling subset of data from the plurality of parallel groups, as described with regard to sampling thread 152. Another step includes, substantially in parallel with the executing of the query, executing the execution plan on the sampling subset of data as sampling thread 152 (see step 314 of FIG. 3). Yet another step includes modifying the execution plan based on feedback from the executing of the execution plan on the sampling subset of data, as per step 312 in FIG. 3.

As noted, in some cases, the modifying includes determining that an entire set of work items associated with the query has to be re-partitioned and the executing of the query has to be restarted; while sometimes the modifying includes performing aggregating and/or re-partitioning operations based on the feedback. As also noted, in some instances, the executing of the query includes periodically performing aggregating and/or re-partitioning operations at an aggregation point 108. There may be a plurality of aggregation points 108, and in some instances, an additional step includes pre-defining at which of the aggregation points 108 the feedback 154 is to be employed for the modifying step.

In some instances, there may be two or more sampling threads. Typically, one thread would work on one set of data while another thread would work on another set of data. A different set can be a different part of the same table or a different table. However, both threads can also operate on the overlapping sets of data, e.g., they sample different or the same rows of a table.

Another optional additional step includes saving results of the sampling, with a time stamp, for future query processing (the future query just referred to could be the same query or a completely different query, or a slightly different query, as long as the objects being processed and sampled are overlapping). Furthermore, another additional optional step includes using the saved results as extra statistics during a query optimization time (this is the future time when the same query or a different query, or a slightly different query is optimized for execution).

As noted elsewhere, the feedback 154 can include one or more of fan-out ratio, data distribution skew, central processing unit time for execution of the sampling thread, elapsed time for execution of the sampling thread, and an indication of buffer pool hits. As also noted elsewhere, another additional optional step can include determining whether low confidence exists in the initial partition, in which case the other steps may be carried out in response to a determination that such low confidence indeed exists.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 4:
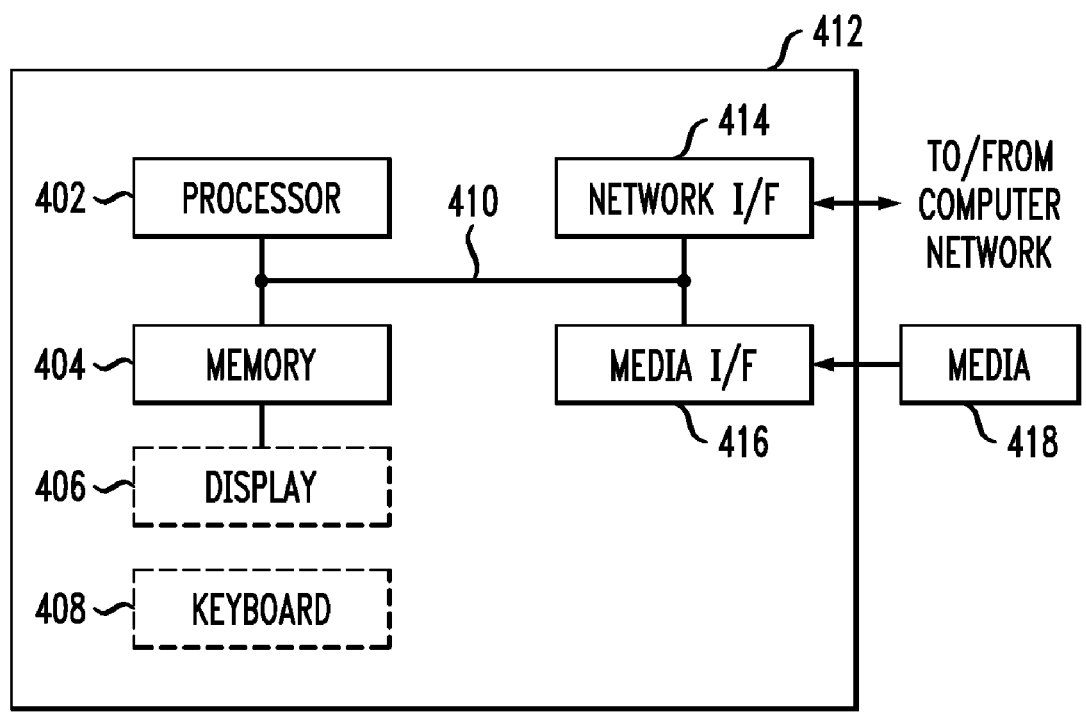
FIG. 4 depicts a computer system that may be useful in implementing one or more aspects and/or elements of the present invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 418) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 404), magnetic tape, a removable computer diskette (for example media 418), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
partitioning a database query into an initial partition comprising a plurality of parallel groups;
executing said query, via an execution plan for performing said query, based on said initial partition;
identifying a first sampling subset of data from said plurality of parallel groups;
substantially in parallel with said executing of said query, executing said execution plan on said first sampling subset of data as a first sampling thread; and modifying said execution plan for performing said query based on feedback from said executing of said execution plan on said first sampling subset of data, wherein said executing of said query comprises periodically performing re-partitioning at an aggregation point, and wherein said modifying comprises performing said re-partitioning based on said feedback, and wherein one or more of said are performed by a hardware device.

2. The method of claim 1, wherein said modifying comprises determining that an entire set of work items associated with said query has to be re-partitioned and said executing of said query has to be restarted.

3. The method of claim 1, wherein there are a plurality of said aggregation points, further comprising pre-defining at which of said aggregation points said feedback is to be employed for said modifying.

4. The method of claim 1, wherein said executing of said query comprises periodically performing aggregating at an aggregation point, and wherein said modifying comprises performing said aggregating based on said feedback.

5. The method of claim 4, wherein there are a plurality of said aggregation points, further comprising pre-defining at which of said aggregation points said feedback is to be employed for said modifying.

6. The method of claim 1, further comprising:
identifying a second sampling subset of data from said plurality of parallel groups; and
substantially in parallel with said executing of said query, executing said execution plan on said second sampling subset of data as a second sampling thread;
wherein said modifying of said execution plan is further based on feedback from said executing of said execution plan on said second sampling subset of data.

7. The method of claim 6, wherein said first and second sampling subsets of data overlap.

8. The method of claim 6, wherein said first and second sampling subsets of data do not overlap.

9. The method of claim 1, further comprising saving results of said sampling, with a time stamp, for future processing of at least one of said query, a slightly modified version of said query, and a completely different query.

10. The method of claim 9, further comprising using said saved results as extra statistics during a time when said at least one of said query, said slightly modified version of said query, or said completely different query is optimized.

11. The method of claim 1, wherein said feedback comprises at least fan-out ratio.

12. The method of claim 1, wherein said feedback comprises at least data distribution skew.

13. The method of claim 1, wherein said feedback comprises at least central processing unit time for execution of said first sampling thread.

14. The method of claim 1, wherein said feedback comprises at least elapsed time for execution of said first sampling thread.

15. The method of claim 1, wherein said feedback comprises at least an indication of buffer pool hits.

16. The method of claim 1, further comprising determining whether low confidence exists in said initial partition, wherein said step of executing said query, said step of identifying said sampling subset, said step of executing said execution plan on said sampling subset, and said step of modifying said execution plan are responsive to a determination that said low confidence exists in said initial partition.

17. A computer program product comprising a computer useable medium including computer usable program code, said computer program product including:
computer usable program code for partitioning a database query into an initial partition comprising a plurality of parallel groups;
computer usable program code for executing said query, via an execution plan, based on said initial partition;
computer usable program code for identifying a sampling subset of data from said plurality of parallel groups;
computer usable program code for, substantially in parallel with said executing of said query, executing said execution plan on said sampling subset of data as a sampling thread; and
computer usable program code for modifying said execution plan based on feedback from said executing of said execution plan on said sampling subset of data,
wherein said executing of said query comprises periodically performing re-partitioning at an aggregation point, and wherein said modifying comprises performing said re-partitioning based on said feedback.

18. The computer program product of claim 17, wherein said computer usable program code for modifying comprises computer usable program code for determining that an entire set of work items associated with said query has to be re-partitioned and said executing of said query has to be restarted.

19. The computer program product of claim 17, wherein said computer usable program code for executing said query comprises computer usable program code for periodically performing re-partitioning at an aggregation point, and wherein said computer usable program code for modifying comprises computer usable program code for performing said re-partitioning based on said feedback.

20. The computer program product of claim 19, wherein there are a plurality of said aggregation points, further comprising computer usable program code for pre-defining at which of said aggregation points said feedback is to be employed for said modifying.

21. The computer program product of claim 17, wherein said computer usable program code for executing said query comprises computer usable program code for periodically performing aggregating at an aggregation point, and wherein said computer usable program code for modifying comprises computer usable program code for performing said aggregating based on said feedback.

22. The computer program product of claim 21, wherein there are a plurality of said aggregation points, further comprising computer usable program code for pre-defining at which of said aggregation points said feedback is to be employed for said modifying.

23. A system comprising:
  a memory; and
  at least one processor, coupled to said memory, and operative to
  partition a database query into an initial partition comprising a plurality of parallel groups;
  execute said query, via an execution plan, based on said initial partition;
  identify a sampling subset of data from said plurality of parallel groups;
  substantially in parallel with said executing of said query, execute said execution plan on said sampling subset of data as a sampling thread; and
  modify said execution plan based on feedback from said executing of said execution plan on said sampling subset of data, wherein said executing of said query comprises periodically performing re-partitioning at an aggregation point, and wherein said modifying comprises performing said re-partitioning based on said feedback.

24. An apparatus comprising:
  means for partitioning a database query into an initial partition comprising a plurality of parallel groups;
  means for executing said query, via an execution plan, based on said initial partition;
  means for identifying a sampling subset of data from said plurality of parallel groups;
  means for, substantially in parallel with said executing of said query, executing said execution plan on said sampling subset of data as a sampling thread; and
  means for modifying said execution plan based on feedback from said executing of said execution plan on said sampling subset of data, wherein said executing of said query comprises periodically performing re-partitioning at an aggregation point, and wherein said modifying comprises performing said re-partitioning based on said feedback.

* * * * *